United States Patent
Hrovat et al.

(10) Patent No.: US 7,792,625 B2
(45) Date of Patent: Sep. 7, 2010

(54) TRACTION CONTROL SYSTEM AND METHOD FOR A VEHICLE

(75) Inventors: Davor Hrovat, Ann Arbor, MI (US);
Michael Fodor, Dearborn, MI (US);
Mitch McConnell, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/359,942

(22) Filed: Jan. 26, 2009

(65) Prior Publication Data
US 2009/0132141 A1    May 21, 2009

Related U.S. Application Data

(62) Division of application No. 10/961,452, filed on Oct. 7, 2004, now Pat. No. 7,499,787.

(51) Int. Cl.
*G06F 17/00* (2006.01)
(52) U.S. Cl. .................................................. 701/82
(58) Field of Classification Search ................ 701/68, 701/69, 71–73, 80, 82, 87
See application file for complete search history.

(56) References Cited

U.S. PATENT DOCUMENTS

| | | |
|---|---|---|
| 4,864,411 A | 9/1989 | Hale et al. |
| 5,265,693 A | 11/1993 | Rees et al. |
| 5,459,661 A | 10/1995 | Yagi et al. |
| 5,492,192 A | 2/1996 | Brooks et al. |
| 5,508,924 A | 4/1996 | Yamashita |
| 5,519,617 A | 5/1996 | Hughes et al. |
| 5,694,321 A | 12/1997 | Eckert et al. |
| 5,710,704 A | 1/1998 | Graber |
| 5,710,705 A | 1/1998 | Eckert |
| 5,711,024 A | 1/1998 | Wanke |
| 5,711,025 A | 1/1998 | Eckert et al. |
| 5,732,378 A | 3/1998 | Eckert et al. |
| 5,735,362 A | 4/1998 | Hrovat et al. |
| 5,735,365 A | 4/1998 | Sako et al. |
| 5,742,507 A | 4/1998 | Eckert |
| 5,813,936 A * | 9/1998 | Kichima et al. ............... 477/97 |
| 6,330,505 B1 | 12/2001 | Schmitt et al. |

(Continued)

FOREIGN PATENT DOCUMENTS

| | | |
|---|---|---|
| EP | 1681196 | 7/2006 |
| JP | 2188637 | 7/1990 |

OTHER PUBLICATIONS

Powell, B.K. et al., "Dynamic Modeling and Control of Hybrid Electric Vehicle Powertrain Systems", Control Systems Magazine, IEEE, vol. 18, Issue 5, Oct. 1998, pp. 17-33.

(Continued)

*Primary Examiner*—Kim T Nguyen
(74) *Attorney, Agent, or Firm*—Allan J. Lippa; Alleman Hall McCoy Russell & Tuttle LLP

(57) ABSTRACT

A traction control system adjusts powertrain output to reduce wheel slip, where a relationship between powertrain output and pedal actuation is adjusted in response to environmental conditions.

14 Claims, 5 Drawing Sheets

Transition Diagram

U.S. PATENT DOCUMENTS

| | | | |
|---|---|---|---|
| 6,397,140 B2 * | 5/2002 | Minowa et al. | 701/96 |
| 6,689,015 B2 | 2/2004 | Schmitt et al. | |
| 7,101,313 B2 | 9/2006 | Kresse et al. | |
| 7,499,787 B2 | 3/2009 | Hrovat et al. | |
| 2006/0080023 A1 | 4/2006 | Hrovat et al. | |

OTHER PUBLICATIONS

Gielniak, M.J. et al., "Power Management Strategy Based on Game Theory for Fuel Cell Hybrid Electric Vehicles", 2004 IEEE 60th Vehicular Technology Conference, vol. 6, Sep. 26-29, 2004, Los Angeles, CA, pp. 4422-4426.

Bongsob Song et al., "Design and Experimental Implementation of Longitudinal Control for Automated Transit Buses", American Control Conference, vol. 3, Jun. 30-Jul. 2, 2004, pp. 2751-2756.

Cikanek, S.R. et al., "Control System and Dynamic Model Validation for a Parallel Hybrid Electric Vehicle", American Control Conference, vol. 2, Jun. 30-Jul. 2, 1999, pp. 1222-1227.

Balluchi, A. et al, "Automotive Engine Control and Hybrid Systems: Challenges and Opportunities", Proceedings of the IEEE, vol. 88, Issue 7, Jul. 2000, pp. 888-912.

Stefanopoulou, A.G. et al., "Analysis and Control of Transient Torque Response in Engines with Internal Exhaust Gas Recirculation", IEEE Transactions on Control Systems Technology, vol. 7, Issue 5, Sep. 1999, pp. 555-566.

Shen, S. et al, "Analysis and Control of Flywheel Hybrid Vehicular Powertrain", IEEE Transactions on Control Systems Technology, vol. 12, Issue 5, Sep. 2004, pp. 645-660.

Burton, A.W. et al., "Active Vibration Control in Automotive Chassis Systems", Computing and Control Engineering Journal, vol. 4, Issue 5, Oct. 1993, pp. 225-232.

Ironside, J.M. et al., "Continuously Variable Transmission Control", 1980 IEEE 30th Vehicular Technology Conference, vol. 30, Sep. 15-17, 1980, pp. 108-115.

Miller, J.M., "Power Electronics in Hybrid Electric Vehicle Applications", 18$^{th}$ Annual IEEE Applied Power Electronics Conference and Exposition, APEC '03, vol. 1, Feb. 9-13, pp. 23-29.

Plotkin, C.W. et al., "Reliability Testing for Customer Satisfaction Attributes", 2004 Annual Reliability and Maintainability Symposium, pp. 280-286.

Lamberson, D. et al., A Model-Based Approach to the Implementation of Automotive Embedded Control Systems, Intelligent Transportation Systems, 2003 IEEE Proceedings, vol. 1, pp. 655-659.

Hebbale, K. et al., "Control of the Geared Neutral Point in a Traction Drive CVT", Proceedings of the 2003 American Control Conference, vol. 3, Jun. 4-6, 2003, pp. 2572-2576.

Jankovic, M. et al., "Power Output Monitoring for Vehicles Equipped with Electronic Throttle", Proceedings of the 2001 American Control Conference, vol. 2, Jun. 25-27, 2001, pp. 1310-1314.

Balluchi, A. et al., "Hybrid Systems and the Design of Embedded Controllers for Automotive Engine Management", Proceedings of the 37$^{th}$ IEEE Conference on Decision and Control, vol. 3, Dec. 16-18, 1998, pp. 2656-2661.

Chunting, Mi et al., "Iterative Learning Control of Antilock Braking of Electric and Hybrid Vehicles", IEEE Transactions on Vehicular Technology, vol. 54, Issue 2, Mar. 2005, pp. 486-494.

Schouten, N.J. et al., "Fuzzy Logic Control for Parallel Hybrid Vehicles", IEEE Transactions of Control Systems Technology, vol. 10, Issue 3, May 2002, pp. 460-468.

Amrhein, M. et al., "Dynamic Simulation for Analysis of Hybrid Electric Vehicle System and Subsystem Interactions, Including Power Electronics", IEEE Transactions on Vehicular Technology, vol. 54, Issue 3, May 2005, pp. 825-836.

From IP.com, a prior art database, Previewing PTCOM000055029D—Adjustment Mechanism for a Torque Limiter, Originally disclosed by IBM on May 1, 1980 UTC United States TDB 05-80 p. 5394, Loaded into the IP.com Prior Art Database on (Feb. 13, 2005 UTC).

From IP.com, a prior art database, IPCOM000048368D, Stepper Motor Control Jan. 1, 1982 UTC, United States, Originally disclosed by IBM on Jan. 1, 1982 UTC, TDB 01-82 p. 4274-4276, Loaded into the IP.com Prior Art Database on (Feb. 8, 2005).

Previewing IPCOM000078580D, Motor Torque Control, Feb. 1, 1973 UTC United States, Originally disclosed by IBM on Feb. 1, 1973 UTC, TBD 02-73 p. 2695-2696, Loaded into the IP.com Prior Art Database on (Feb. 26, 2005).

Fodor, M. et al., "Active Control of Vehicle Dynamics", Proceedings of 1998 Digital Avionics Systems Conference, 17$^{th}$ DASC, The AIAA/IEEE/SAE, vol. 2, Oct. 3-Nov. 7, 1998, pp. I14/1-I14/8.

Deacon, M. et al., "A Modular Approach to the Computer Simulation of a Passenger Car Powertrain Incorporating a Diesel Engine and Continuously Variable Transmission", International Conference on Control, vol. 1, Mar. 21-24, 1994, pp. 320-325.

Wagner, J.R. et al., "Nonlinear Air-to Fuel Ratio and Engine Speed Control for Hybrid Vehicles", IEEE Transactions of Vehicular Technology, vol. 52, Issue 1, Jan. 2003, pp. 185-195.

* cited by examiner

TRACTION CONTROL SYSTEM AND METHOD FOR A VEHICLE

CROSS REFERENCE TO PARENT APPLICATION

This present application is a divisional of U.S. application Ser. No. 10/961,452 filed Oct. 7, 2004, entitled "Traction Control System and Method for a Vehicle", naming Davor Hrovat, Michael Fodor, and Mitch McConnell, as inventors, the entire contents of which are incorporated herein by reference.

BACKGROUND AND SUMMARY

Some of the most challenging tasks for current Traction Control (TC) systems include situations where a vehicle is "stuck" in (deep) snow or mud, or on a possibly icy and/or inclined road.

One approach to vehicle traction control in non-moving conditions is described in U.S. Pat. No. 5,265,693. In this example, higher slip may be used if controller senses a non-moving (stuck) vehicle. In another approach, (U.S. Pat. No. 5,735,362), the controller uses a combination of a controlled increase in target wheel slip and subsequent phases that reduces driving power and torque to the wheels.

However, the inventors herein have recognized potential issues with such approaches. For example, the use of solely higher slip may actually cause the vehicle to become more entrenched and reduce the ability of the operator to move the vehicle. Also, in continuing traction control intervention that still may not move the vehicle, the operator may become frustrated to the point of turning the traction control system off, and trying to negotiate the situation without traction control active. These issues may lead to decreased customer satisfaction.

In one approach, a method for controlling a powertrain of a vehicle with wheels, the vehicle having a pedal actuated by a driver, is described. The method comprises:

generating powertrain torque transmitted to the wheels in a first relation to actuation of the pedal by the driver during a first condition where said transmitted torque causes said wheels to slip relative to a surface;

overriding said driver actuated powertrain torque to control said slip; and during a second condition after said first condition where said vehicle is moving less than a threshold, generating powertrain torque transmitted to the wheels in a second relation to actuation of the pedal by the driver, where for a given pedal position, less powertrain torque is transmitted with said second relation compared to said first relation.

In this way, if overriding driver actuation to perform traction control still results in a non-moving vehicle condition, for example, the traction management system can return control to the driver, but with finer resolution at lower torques to better navigate the condition. In other words, in one example, the vehicle's powertrain response behavior to a command input may be modified if a non-moving condition is identified in order to provide the driver higher resolution powertrain torque output control. In this way, improved vehicle performance may be achieved, and improved customer satisfaction obtained.

In one example, once the vehicle is moving a sufficient amount, the vehicle vehicle's powertrain response behavior can be returned to that which corresponds to a moving vehicle. This transition may be gradual, in one example, so that driver perception of the transition may be reduced.

Note that various types of relations may be used, such as linear or non-linear, for example. Further, the relations may be a function of various other parameters, such as, for example, transmission gear state, temperature, or others.

DETAILED DESCRIPTION

Traction control systems may be used to adjust powertrain output to improve vehicle operation in situations that may result in reduced traction between a vehicle's wheel and the road. As noted above, a non-moving vehicle situation can be especially challenging where even limiting powertrain output and controlling wheel slip may not result in any significant movement of the vehicle. The following disclosure addresses such a situation, as well as others.

Figure 1:
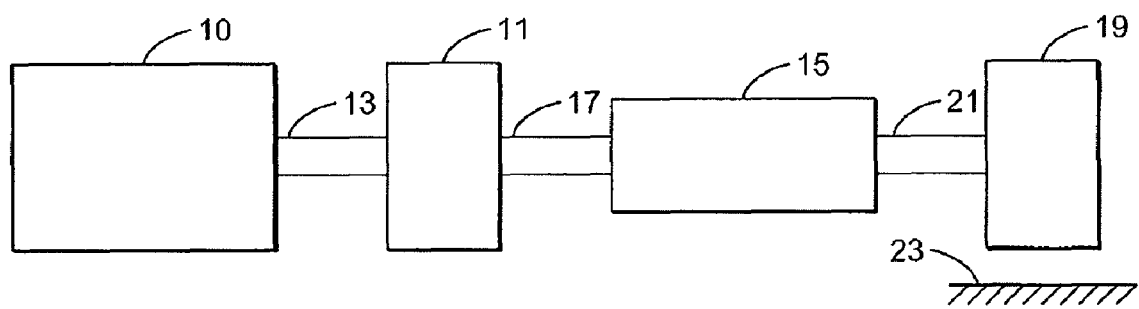
FIGS. 1-2 are block diagrams of a vehicle powertrain and an engine.
Figure 2:
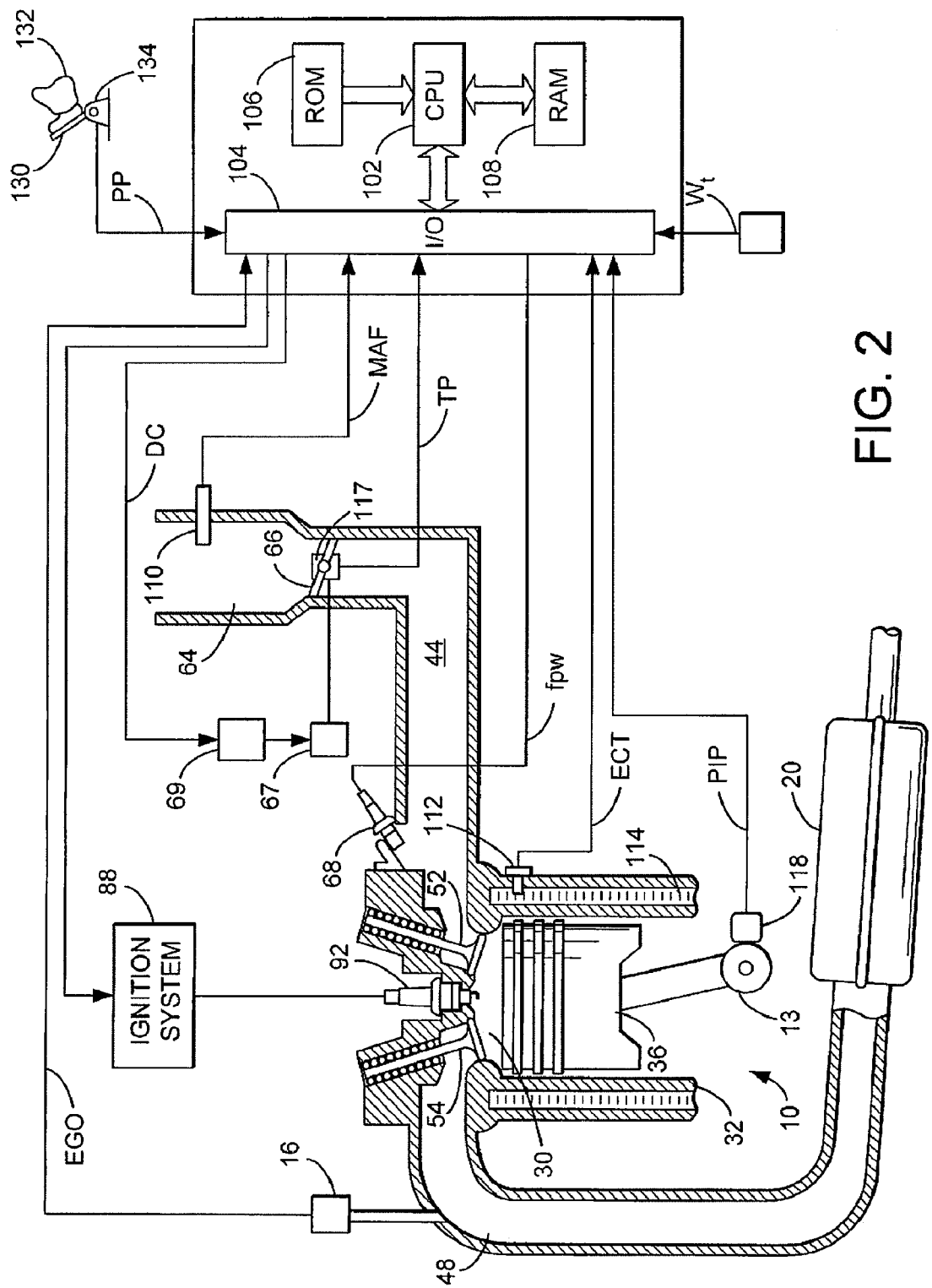

Referring to FIG. 1 an example powertrain of a vehicle is shown. Specifically, internal combustion engine 10, further described herein with particular reference to FIG. 2, is shown coupled to torque converter 11 via crankshaft 13. Torque converter 11 may also coupled to transmission 15 via transmission input shaft 17. Torque converter 11 may have a bypass clutch (described in FIGS. 20-23), which can be engaged, disengaged, or partially engaged. When the clutch is either disengaged or partially engaged, the torque converter is said to be in an unlocked state. While this example shows an automatic transmission with a torque converter, a manual transmission may also be used, or no torque converter may be used.

Transmission 15 may comprise an electronically controlled transmission with a plurality of selectable discrete gear ratios. Transmission 15 may also comprise various other gears such as, for example, a final drive ratio (not shown). Transmission 15 is also coupled to tire 19 via axle 21. Tire 19 interfaces the vehicle (not shown) to the road 23. In one embodiment, transmission 15 has the following driver selectable options: park (P), reverse (R), neutral (N), driver (D), and low (L). The driver selects these positions via a transmission lever.

Internal combustion engine 10 comprises a plurality of cylinders, one cylinder of which is shown in FIG. 2. Electronic engine controller 12 may be used to control engine 10, and optionally transmission 15, if desired. Alternatively, a separate transmission controller may be used. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

While the above engine and powertrain are one example that may be used, various other powertrains may be used. In particular, the systems and methods described herein may be used in any wheeled vehicles with a torque-producing powertrain in which traction may be an issue.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17; and a profile ignition pickup signal (PIP) from Hall effect sensor 118 coupled to crankshaft 13 indicating and engine speed (N).

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

While FIG. 2 shows a spark ignition engine, a compression ignition engine may also be used. Further, while valves 52 and 54 are cam driven in one example, they may also be electrically actuated valves, or hydraulically deactivatable valves. Further, while FIG. 2 shows a port fuel injected engine with injector 68 in an intake port, alternative engines may be used, such as a directly injected engine where injector 68 is coupled to inject fuel directly into combustion chamber 30. Further, other powertrain systems may be used, such as hybrid electric, diesel, fuel cell, or others.

Figure 3:
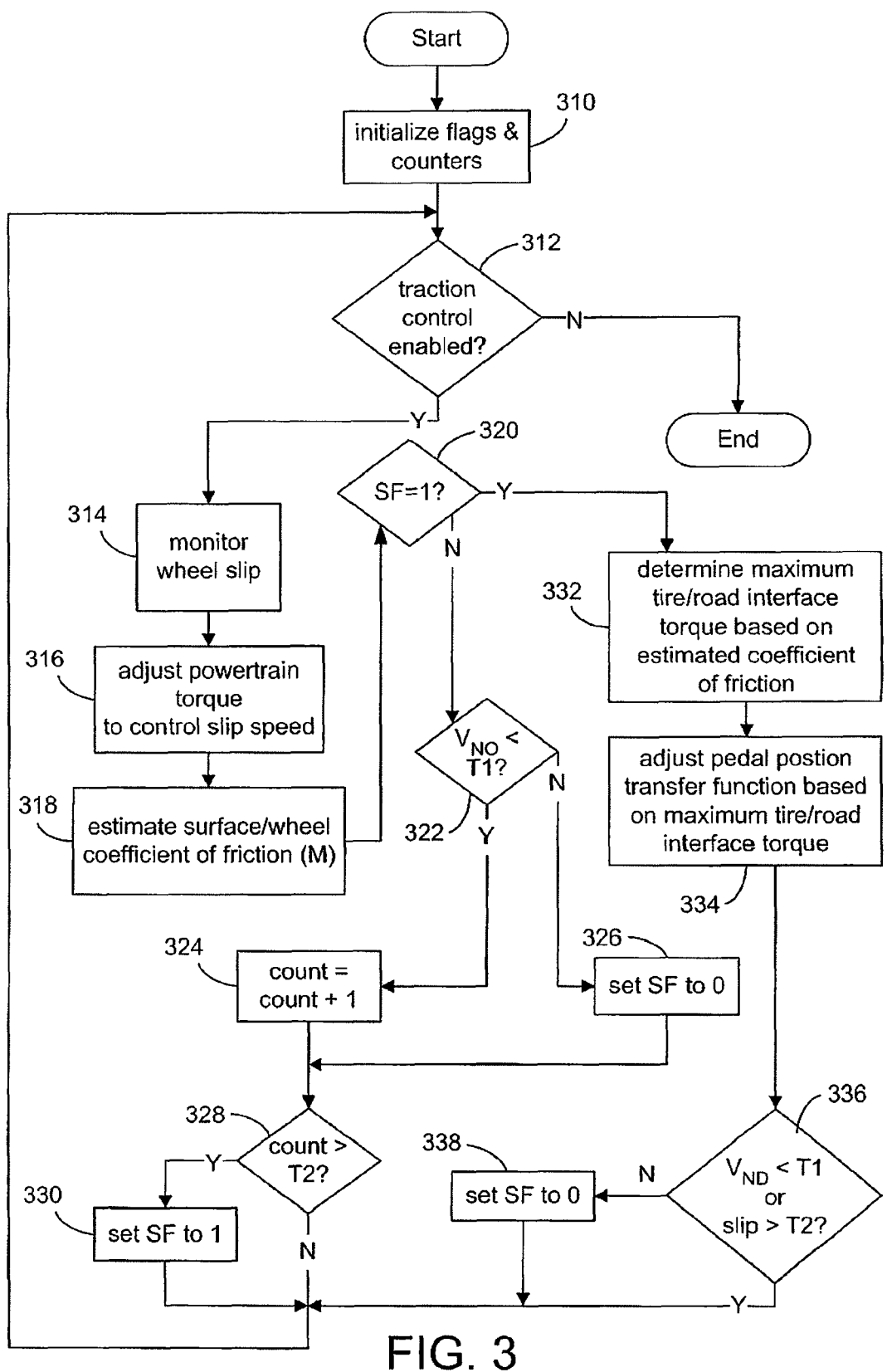
FIG. 3 is a high-level flow chart of various operations.
Figure 4:
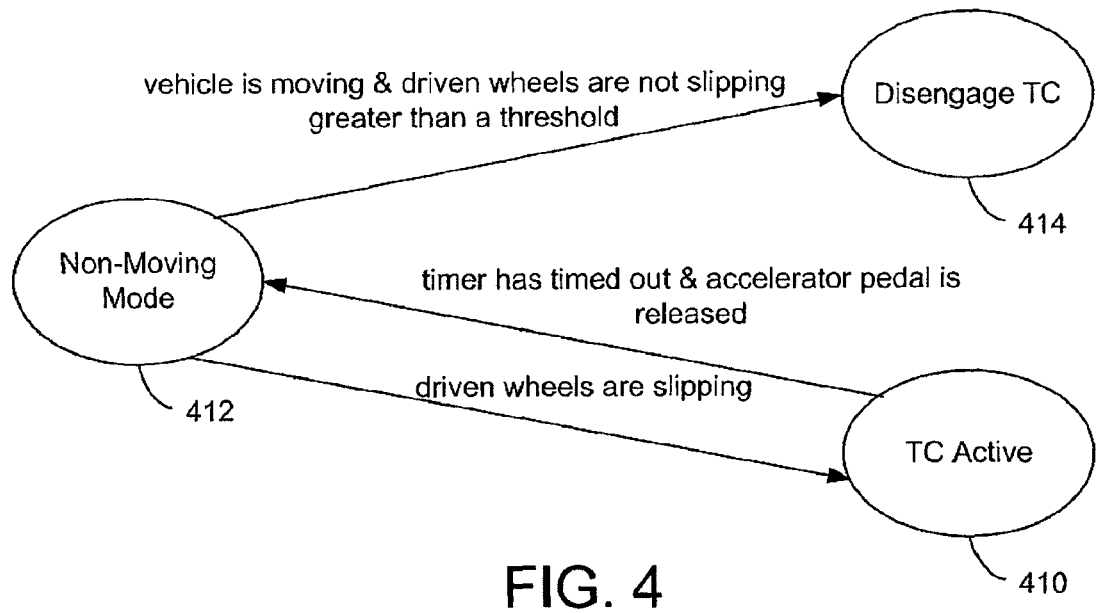
FIG. 4 is a high-level state transition diagram of various operations.

Referring now to FIGS. 3-4, example routines are described for performing traction control with different modes depending on a condition of the vehicle, for example. Specifically, in FIG. 3, a routine is described for detecting a non-moving vehicle condition during traction control operation, and then returning control to the driver with limited powertrain output torque (and higher resolution) by modifying a relationship between pedal position and requested output, such as engine torque.

Referring now to FIG. 3, in step 310 the routine initializes various flags and counters, including initializing flag (SF) and counter (COUNT) to zero. Then, the routine continues to step 312. In step 312, the routine determines whether traction control is enabled. If the answer to step 312 is no, the routine ends. If the answer to step 312 is yes, the routine continues to step 314. Note that various parameters may be used to enable traction control such as for example: a driver actuated button on a dash panel, measured vehicle wheel slip by driven wheels being greater than a threshold value, combinations thereof or various others.

In step 314, the routine monitors the wheel slip of the driven wheels. This can be determined by comparing the measured speed of driven wheels as compared to non-driven wheels. Then, in step 316, the routine adjusts powertrain torque to control the slip speed. For example, engine torque requested by the driver (via the pedal) may be adjusted or reduced by retarding ignition timing, closing an electronically controlled throttle plate, adjusting variable valve and/or cam timing, adjusting electrically actuated valve timing and/or lift, adjusting a transmission gear ratio, adjusting a transmission clutch, adjusting a torque converter clutch, combinations thereof, or various others. In this way, traction control overrides a driver's torque request to reduce and/or control wheel slip and improve traction. However, as described herein, such actions may not always be entirely successful in moving the vehicle. Note that while these are exemplary traction control systems, any other types of traction control system may be used.

Next, in step 318, the routine estimates the surface/wheel coefficient of friction ($\mu$). In one example, this can be estimated based on an estimated powertrain torque being transmitted by the wheels and the measured slip speed. Specifically, an estimated torque (Trq_est), which may be calculated as an engine torque, may be calculated based on an estimate of the wheel torque, reflected upstream through the driveline, transmission and torque converter, taking into account dynamics effects of various inertias and other elements, as appropriate.

Note also that adaptive routines may also be used that adaptively learn the estimated surface/wheel coefficient of friction. Still further, other parameters may also be used to adjust the estimate of the coefficient or friction, such as temperature, vehicle weight and various others.

Next, in step 320, the routine determines whether the flag (SF) is currently set to 1. When the flag SF is set to 1, this indicates that a substantially non-moving condition has been identified. When the answer to step 320 is yes, the routine continues to step 322. Alternatively, when the answer to step 320 is no, the routine continues to step 322.

In step 322, the routine determines whether the velocity of the non-driven ($V_{ND}$) is less than a first threshold (T1). If so, this indicates that the vehicle is still in a substantially non-moving mode, and the routine continues to step 324 to increment the counter (COUNT). In one approach, a substantially non-moving vehicle condition may be detected via wheel speed sensors on driven and/or non-driven wheels. In an alternative embodiment, directional wheel speed sensors may be used, which could determine if vehicle is rolling back, for example. In still another example, any other method for determining if the vehicle is stuck may be used, such as a GPS system, an accelerometer, or combinations thereof.

Returning to steps 324, in one approach, the counter is incremented by a delta time (e.g., $\Delta t$) so that the counter variable is representative of a time that the vehicle has been in a nonmoving condition. Note that when setting the threshold for such a timer, the routine may distinguish the value of the threshold depending on the initial condition (e.g. depending on whether the vehicle was slowing down, originally stopped, etc.).

Alternatively, the counter can be incremented by 1 as shown in step 324 of FIG. 3, and be representative of engine revolutions, sample events, or others. Alternatively, when the step 322 is no, the routine continues to step 326 to reset the flag (SF) to zero indicating that the vehicle is no longer in a non-moving condition.

From either steps 324 or 326, the routine continues to step 328 to compare the counter value (COUNT) to a second threshold (T2). When the answer to step 328 is yes indicating that the counter is above the threshold, the routine continues to step 330 to set the flag (SF) to one. From step 330, or a no from step 328, the routine continues back to step 312. In this way, the routine first attempts to provide traction control operation where wheel slip is controlled and monitors whether this condition exists for greater than a predetermined amount, such as for a predetermined amount of time. Then, if such operation is not successful in moving the vehicle, primary control is returned to the driver's pedal actuation, albeit with a modified relationship as shown below.

Returning to step 332, the routine determines a maximum tire/road interface torque based on the estimated coefficient of friction. Next, in step 334, the routine adjusts the pedal position transfer function based on the determined tire/road interface torque using a factor k. In one example, the scaling value k may be chosen close to one (e.g., 1, or 1.1), and it may be calibrated to correspond to desired vehicle behavior.

From step 334, the routine continues to step 336 to determine whether the non-driven velocity is less than the first threshold (T1). If not, the routine continues to step 338 to set the flag (SF) to zero. Alternatively, when the answer to step 336 is yes, the routine continues to return to step 312.

Returning to step 334, several additional details are described. As noted above, during non-traction control operation, a relationship is used to relate driver actuated pedal operation to a desired vehicle, or powertrain, response (e.g., torque). If a non-moving condition is identified during traction control operation, this relationship may be adjusted based on the traction control operation, as noted above.

Figure 5:
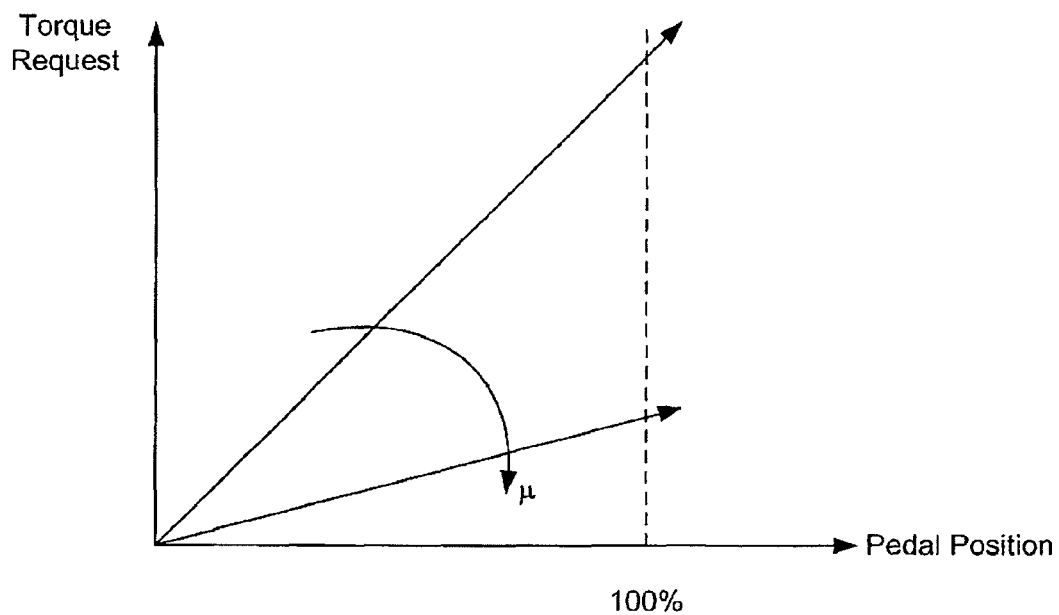
FIG. 5 is a graph illustrating relationships between pedal actuation and torque.

In one approach, pedal position is used to determine a desired wheel torque, desired vehicle acceleration, desired engine torque, desired transmission torque, combinations thereof, or others, for example. One example relationship between pedal position and vehicle response may be defined as shown in FIG. 5. Specifically, FIG. 5 shows an example relationship between pedal position and a request torque. Further, FIG. 5 shows how this relationship may be adjusted, or scaled, based on the estimate friction determined during a previous condition where wheel slip occurred. While FIG. 5 shows an example linear relationship between pedal position and the output request, various others may be used, and may be adjusted based on numerous other conditions as well.

In this way, before traction control is enabled, the driver operates the vehicle with a first relationship between pedal position and vehicle response, such as torque. Then, when slip is detected, traction control attempts to control slip by reducing engine and/or powertrain torque, and improve the ability of the vehicle to move. However, in some conditions, the vehicle may remain substantially non-moving, or stuck. In this case, vehicle control (e.g., powertrain torque) may be returned to the driver's pedal position, but with a modified, or scaled, relationship so that finer resolution at low output values may be obtained. In this way, the operator may better navigate the stuck condition, with reduced traction control intervention (although such intervention may still occur, if desired).

Elements of the routine may also be illustrated by the state transition diagram of FIG. 4, which shows three states (410, 412, and 414). Specifically, state 410 represents a traction control active state where powertrain output is actively adjusted or limited to control slip to be at or below a threshold value, somewhat unrelated to the driver's actuation of the pedal. However, if this operation continues for greater than a threshold duration (e.g., longer than an amount of time) and the vehicle is substantially non-moving, the state transitions to state 412 (a non-moving vehicle state). Note also that other conditions may be used to transition from state 410 to 412, such as whether the driver releases the accelerator pedal.

In state 412, the powertrain output is returned to being proportional with the pedal actuation by a driver, however it may be scaled based on an estimated coefficient of friction, as describe herein. While in state 412, if the driven wheels again slip greater than a threshold amount, the state returns to state 410 where traction control again tries to reduce powertrain torque output to control slip. Alternatively, if the vehicle starts moving and the slip of the driven wheels falls below a threshold value (e.g., T1), then the state transitions to state 414. State 414 disengages traction control and returns the pedal position to torque request relationship to provide the full powertrain torque availability. In one example, the disengagement and return to full torque availability may be performed gradually.

In this way, it may be possible to improve traction control effectiveness in non-moving vehicle situations, for example.

Thus, in one approach, the gain between the gas pedal position and net powertrain (e.g., engine) torque may be effectively changed (e.g., lowered) during a non-moving vehicle condition. This may further be done as a function of road friction conditions represented by coefficient μ, as shown in more detail with regard to FIG. 5. As noted above, adjusting the relationship between pedal position and powertrain output torque in certain situations may be triggered by first detecting that the vehicle is (substantially) not moving within a predetermined, calibratable time. In the case of a valid trigger, the maximum possible tire/road interface torque (Trq_est) may then be estimated from the first (or a previous) wheel spin. A scaled version of the torque (Trq_est) may then be used as the maximum allowed (engine) torque request (Trq_max) corresponding to the full 100% gas pedal position, i.e., Trq_max may be set to k*Trq_est.

Another result of the above proposed approach is that one may obtain finer gas pedal resolution and overall "feel" for the slippery road, where the gas pedal stroke may be effectively adopted to best suit the existing, slippery road conditions. In one example, the net effect is that the driver may have improved drive feel while at the same time producing maximum practical tractive forces that the given tire/road interface can sustain (and thus reducing the need for intervention by the traction control system).

Example expected results using such an approach on a vehicle during the winter are shown in FIG. 6. This plot shows predicted data for a vehicle that is "stuck" on a 6-10% grade snow/ice covered hill. As shown by the data in FIG. 6, in various situations, after enabling at least portions of the above routines, the vehicle was able to move.

Figure 6A:
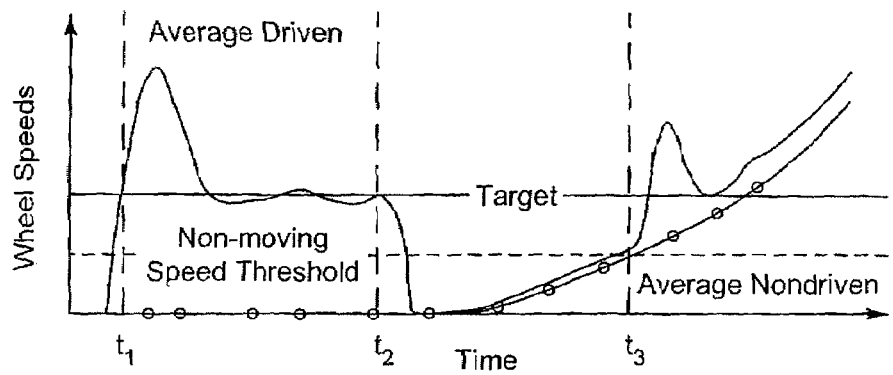
FIG. 6 shows example predicted system response.
Figure 6B:
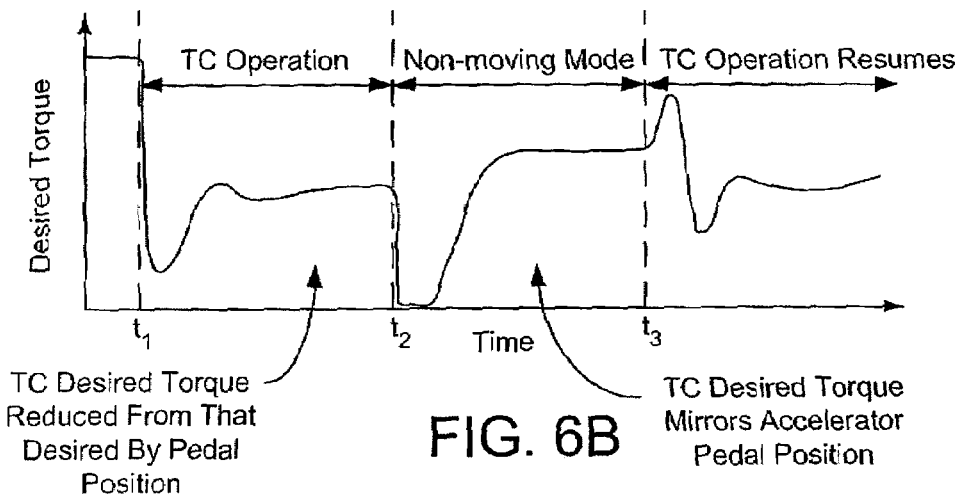
Figure 6C:
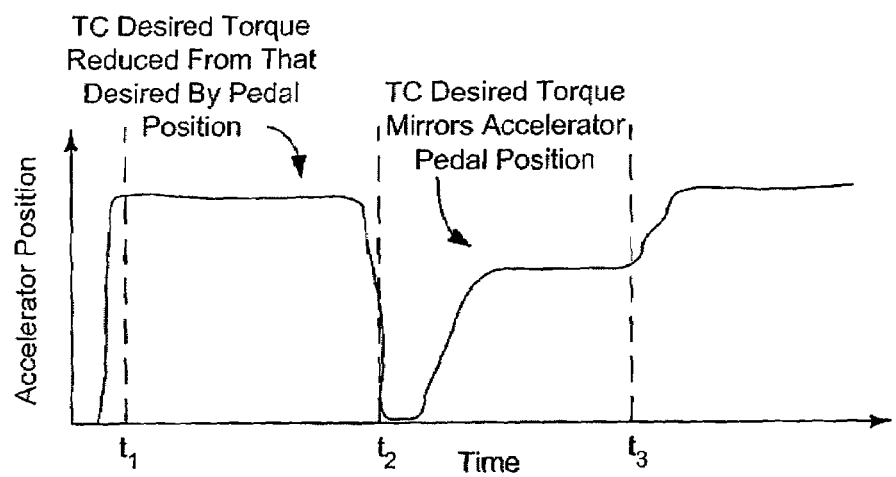

Specifically, FIGS. 6A-C shows wheel speeds, desired torque, and pedal position, respectively, over time. Before time t1, the driver actuates the pedal 134, which causes a corresponding increase in desired torque. The powertrain responds to initially provide this torque, which causes wheel slip to occur. As shown by the solid line of FIG. 6A, the driven wheel speed increases, but the non-driven wheel speed (line with dots) remains substantially zero. At time t1, traction control engages to reduce desired torque (even though the driver is still actuating the pedal 134) to control slip to the target value. However, even with such slip control, the vehicle speed (via the non-driven wheels) remains substantially zero. After a duration and after the operator releases pedal 134, at time t2 the controller operates the vehicle in another mode where the driver is again provided direct control, yet with a smaller range of authority. At this time, the driver actuates the pedal, without active slip control, but with a reduced gain, to obtain vehicle movement. However, since this limited gain control is not useful for many conditions outside of the present non-moving slip condition, at time t3 the controller again transitions to operate in slip control. In this way, improved vehicle operation may be obtained.

Note that while the above disclosure provides various example approaches that may be used, various other modifications, additions, or deletions may be made. For example, it is possible to further constrain the application of the above controls, by requiring that the non-moving condition mode be identified only if, in addition to the above vehicle immobile timing requirements, the brake also be applied (e.g., a brake on/off signal is activated). This may secure that the next gas pedal application will start from a stationary wheel position (zero slip), which can often lead to larger torques before actually spinning the wheels. In other words, in many cases, there is a torque peaking just before "braking lose"—similar to the force picking just before braking a sticktion in stick-slip situations).

As another example, the disclosed approach may be used with both an electronic throttle system or non-electronic throttle system (e.g., by reducing engine torque via spark and fuel, for example). Further, other approaches to torque reduction may be used, such as a cable stretcher, air/fuel ratio control, and other methods for other types of powertrains, or combinations thereof.

As still another example, the driver pedal relation could be further refined and extended by combining the above approach with the automatic transmission upshifting, which is often used to further reduce the wheel torque.

As yet another example, the above pedal sensitivity adaptation may be combined with a multi-position switch/knob (e.g. 4 positions, indicating "dry road", "wet road", "snow", and "ice"). The driver could then chose an appropriate position depending on current road conditions—e.g. snowy road, and this would change the gas pedal sensitivity to a prescribed setting, typical of the current knob setting. While a knob or switch in the driver's cockpit area may be one example, various other types of input devise may be used, such as, for example, voice recognition, satellite weather and/or road information, weather sensors (e.g., a rain sensor), combinations thereof, or others.

Operation could be further refined by identifying the correct maximum road torque for the current conditions, after the driver causes the first spin (where an owners manual may explain to the driver that to fully utilize this function, he or she should first cause the "probing" spin with an appropriate tip-in, before switching to a low friction setting). This feature may be especially useful when driver identifies that he is on a continuous (e.g. ice) surface, such as an ice hill. The appropriately reduced pedal-to-torque transfer function may then give improved control and an improved chance of climbing the hill.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, the wheel slip control may be applied to any powertrain that drives wheels and is controlled by a driver using some input device, such as, for example, electric, hybrid/electric, diesel, diesel hybrid, gasoline hybrid, fuel cell, or others. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A system for a vehicle, comprising:
a traction control system to reduce wheel slip;
an input device located in said vehicle that identifies an environmental condition; and
a powertrain controller to control powertrain output based on actuation of a vehicle pedal, where a first relationship between said powertrain output and said vehicle pedal is adjusted in response to said input device when a vehicle driver is applying said vehicle pedal with active slip control provided by the traction control system and where a second relationship between said powertrain output and said vehicle pedal is applied to said vehicle after said vehicle driver releases said vehicle pedal, where after the release, pedal actuation provides direct control by the driver of powertrain torque without active slip control.

2. The system of claim 1 wherein said input device receives input from the vehicle driver.

3. The system of claim 1 wherein said input device receives input from a sensor that senses a condition of an environment outside the vehicle.

4. The system of claim 1 wherein said input device is a knob adjusted by the vehicle driver.

5. The system of claim 4 wherein said knob is configured to enable selections corresponding to driver identified road conditions.

6. The system of claim 1 wherein said first relationship is different from said second relationship, and wherein the controller further controls powertrain output based on actuation of the vehicle pedal via the first relationship, after application of the second relationship, once the vehicle is moving a sufficient amount.

7. A system for a vehicle, comprising:
an accelerator pedal; and
a controller, said controller having a first mode with a first relationship between a position of the accelerator pedal and a powertrain output, said first mode limiting powertrain output to reduce wheel slip while said vehicle is in a non-moving condition, and said controller activating a second mode after a driver releases said accelerator pedal, said second mode having a second relationship between said accelerator pedal position and said powertrain output, where during the second mode, pedal actuation provides direct control by the driver of powertrain torque without active slip control.

8. The system of claim 7 wherein said first relationship is different from said second relationship and wherein a speed of said vehicle is substantially zero.

9. The system of claim 8 wherein during said second mode, said powertrain output is gradually increased relative to said position of said accelerator pedal when said vehicle begins to move and said wheel slip falls below a threshold.

10. The system of claim 7 wherein said powertrain output is scaled with a position of said accelerator pedal.

11. The system of claim 7 further comprising upshifting an automatic transmission to reduce wheel slip.

12. The system of claim 7 further comprising adjusting a sensitivity of said accelerator pedal in response to a driver input.

13. The system of claim 7 where the second relationship between an accelerator pedal position and the powertrain output has a smaller range of authority, the controller further having a third mode with the first relationship between the position of the accelerator pedal and the powertrain output, said third mode limiting the powertrain output to reduce wheel slip while said vehicle is moving, said controller activating the third mode after the second mode, and after the vehicle is moving a sufficient amount.

14. A system for a vehicle, comprising:
an accelerator pedal; and
a controller, said controller having a first mode with a first relationship between a position of the accelerator pedal and a powertrain output, said first mode limiting powertrain output to reduce wheel slip while said vehicle is in a non-moving condition, and said controller activating a second mode after a driver releases said accelerator pedal, said second mode having a second, different, relationship with less gain between said accelerator pedal position and said powertrain output, where during the second mode, pedal actuation provides direct control by the driver of powertrain torque without active slip control, the controller further having a third mode with the first relationship between the position of the accelerator pedal and the powertrain output, said third mode limiting powertrain output to reduce wheel slip while said vehicle is moving, said controller activating the third mode after the second mode, and after the vehicle is moving a sufficient amount.

* * * * *